(12) United States Patent       (10) Patent No.:    US 12,579,251 B2

Heller et al.                        (45) Date of Patent:        Mar. 17, 2026

---

(54) SYSTEM AND METHOD FOR DETECTING EXCESSIVE PERMISSIONS IN IDENTITY AND ACCESS MANAGEMENT

(71) Applicant: Wiz, Inc., New York, NY (US)

(72) Inventors: Or Heller, Tel Aviv (IL); Raaz Herzberg, Tel Aviv (IL); Yaniv Joseph Oliver, Tel Aviv (IL); Osher Hazan, Mazkeret Batia (IL); Niv Roit Ben David, Tel Aviv (IL); Ami Luttwak, Binyamina (IL); Roy Reznik, Tel Aviv (IL)

(73) Assignee: Wiz, Inc., New York, NY (US)

( * ) Notice: Subject to any disclaimer, the term of this patent is extended or adjusted under 35 U.S.C. 154(b) by 377 days.

(21) Appl. No.: 18/148,070

(22) Filed: Dec. 29, 2022

(65)              Prior Publication Data

US 2023/0161871 A1      May 25, 2023

Related U.S. Application Data

(63) Continuation-in-part of application No. 18/055,180, filed on Nov. 14, 2022.

(Continued)

(51) Int. Cl.
  *G06F 21/53*         (2013.01)
  *G06F 21/62*         (2013.01)

(52) U.S. Cl.
  CPC .......... *G06F 21/53* (2013.01); *G06F 21/6218* (2013.01); *G06F 2221/033* (2013.01)

(58) Field of Classification Search
  CPC ................. G06F 21/53; G06F 21/6218; G06F 2221/033; G06F 21/554
  See application file for complete search history.

(56)                References Cited

U.S. PATENT DOCUMENTS

| | | | |
|---|---|---|---|
| 6,910,132 | B1 | 6/2005 | Bhattacharya |
| 7,627,652 | B1 | 12/2009 | Commons et al. |

(Continued)

FOREIGN PATENT DOCUMENTS

| | | |
|---|---|---|
| CN | 106462439 A | 2/2017 |
| CN | 109240804 A | 1/2019 |

(Continued)

OTHER PUBLICATIONS

Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber= 8270590 (Year: 2018).

(Continued)

*Primary Examiner* — Christopher A Revak

(74) *Attorney, Agent, or Firm* — M&B IP Analysts, LLC

(57)                ABSTRACT

A system and method for detecting excessive permissions of a principal in a cloud computing environment utilizes code objects of infrastructure as code. The method also includes accessing a configuration code, the configuration code including a plurality of code objects, where a code object of the plurality of code objects corresponds to a deployed principal in the cloud computing environment; detecting in a log a plurality of access events, each access event associated with a first principal deployed in the cloud computing environment based on a first code object of the plurality of code objects; determining that the first code object includes a permission which is not utilized in any of the plurality of access events; and initiating a mitigation action for the first principal based on the permission.

23 Claims, 7 Drawing Sheets

Related U.S. Application Data

(60) Provisional application No. 63/267,368, filed on Jan. 31, 2022, provisional application No. 63/283,376, filed on Nov. 26, 2021, provisional application No. 63/283,379, filed on Nov. 26, 2021, provisional application No. 63/283,378, filed on Nov. 26, 2021, provisional application No. 63/264,550, filed on Nov. 24, 2021.

(56) References Cited

U.S. PATENT DOCUMENTS

| | | | |
|---|---|---|---|
| 7,784,101 | B2 | 8/2010 | Verbowski et al. |
| 8,104,075 | B2 * | 1/2012 | Spector ................. G06F 21/604 726/1 |
| 8,200,965 | B2 | 6/2012 | Fujibayashi et al. |
| 8,320,558 | B1 | 11/2012 | Zea |
| 8,352,431 | B1 | 1/2013 | Protopopov et al. |
| 8,412,688 | B1 | 4/2013 | Armangau et al. |
| 8,413,239 | B2 | 4/2013 | Sutton |
| 8,417,967 | B2 | 4/2013 | Foster et al. |
| 8,499,354 | B1 | 7/2013 | Satish et al. |
| 8,595,822 | B2 | 11/2013 | Schrecker et al. |
| 8,701,200 | B2 | 4/2014 | Naldurg et al. |
| 8,789,049 | B2 | 7/2014 | Hutchins et al. |
| 8,813,234 | B1 | 8/2014 | Bowers et al. |
| 8,898,481 | B1 | 11/2014 | Osburn, III et al. |
| 8,904,525 | B1 | 12/2014 | Hodgman et al. |
| 8,914,406 | B1 | 12/2014 | Haugsnes |
| 9,009,836 | B1 | 4/2015 | Yarykin et al. |
| 9,094,379 | B1 | 7/2015 | Miller |
| 9,119,017 | B2 | 8/2015 | Sinha |
| 9,165,142 | B1 | 10/2015 | Sanders et al. |
| 9,172,621 | B1 | 10/2015 | Dippenaar |
| 9,185,136 | B2 | 11/2015 | Dulkin et al. |
| 9,330,273 | B2 | 5/2016 | Khetawat et al. |
| 9,369,433 | B1 | 6/2016 | Paul |
| 9,419,996 | B2 | 8/2016 | Porat |
| 9,438,634 | B1 | 9/2016 | Ross et al. |
| 9,467,473 | B2 | 10/2016 | Jayaraman |
| 9,544,327 | B1 | 1/2017 | Sharma et al. |
| 9,563,385 | B1 | 2/2017 | Kowalski et al. |
| 9,569,328 | B2 | 2/2017 | Pavlov et al. |
| 9,582,662 | B1 | 2/2017 | Messick et al. |
| 9,596,235 | B2 | 3/2017 | Badam et al. |
| 9,607,104 | B1 | 3/2017 | Turner et al. |
| 9,621,595 | B2 | 4/2017 | Lian et al. |
| 9,646,172 | B1 | 5/2017 | Hahn |
| 9,661,009 | B1 | 5/2017 | Karandikar et al. |
| 9,665,465 | B1 * | 5/2017 | Jain ......................... G06F 11/30 |
| 9,672,355 | B2 | 6/2017 | Titonis et al. |
| 9,712,503 | B1 | 7/2017 | Ahmed |
| 9,892,261 | B2 | 2/2018 | Joram et al. |
| 9,992,186 | B1 | 6/2018 | Drozd et al. |
| 10,002,247 | B2 | 6/2018 | Suarez et al. |
| 10,009,337 | B1 | 6/2018 | Fischer et al. |
| 10,032,032 | B2 | 7/2018 | Suarez et al. |
| 10,044,723 | B1 | 8/2018 | Fischer et al. |
| 10,135,826 | B2 | 11/2018 | Reddy |
| 10,205,638 | B1 | 2/2019 | Angrish et al. |
| 10,229,125 | B2 | 3/2019 | Goodman et al. |
| 10,255,370 | B2 | 4/2019 | Carpenter et al. |
| 10,360,025 | B2 | 7/2019 | Foskett et al. |
| 10,412,103 | B2 | 9/2019 | Haugsnes |
| 10,412,109 | B2 | 9/2019 | Loureiro et al. |
| 10,459,664 | B1 | 10/2019 | Dreier et al. |
| 10,509,909 | B2 | 12/2019 | Andriani |
| 10,536,471 | B1 | 1/2020 | Derbeko et al. |
| 10,540,499 | B2 | 1/2020 | Wailly et al. |
| 10,552,610 | B1 | 2/2020 | Vashisht et al. |
| 10,554,507 | B1 | 2/2020 | Siddiqui et al. |
| 10,567,468 | B2 | 2/2020 | Perlmutter |
| 10,572,226 | B2 | 2/2020 | Biskup et al. |
| 10,574,675 | B2 | 2/2020 | Peppe et al. |
| 10,623,386 | B1 | 4/2020 | Bernat et al. |
| 10,630,642 | B2 | 4/2020 | Clark et al. |
| 10,664,619 | B1 | 5/2020 | Marelas |
| 10,691,636 | B2 | 6/2020 | Tabaaloute et al. |
| 10,721,260 | B1 | 7/2020 | Schlarp et al. |
| 10,725,775 | B2 | 7/2020 | Suarez et al. |
| 10,728,252 | B2 | 7/2020 | Desai et al. |
| 10,735,430 | B1 | 8/2020 | Stoler |
| 10,735,442 | B1 | 8/2020 | Swackhamer |
| 10,791,138 | B1 | 9/2020 | Siddiqui et al. |
| 10,803,188 | B1 | 10/2020 | Rajput et al. |
| 10,831,898 | B1 | 11/2020 | Wagner |
| 10,887,333 | B1 | 1/2021 | Pereira et al. |
| 10,915,626 | B2 | 2/2021 | Tang |
| 10,924,503 | B1 | 2/2021 | Pereira et al. |
| 10,949,406 | B1 | 3/2021 | Calvo et al. |
| 10,972,484 | B1 | 4/2021 | Swackhamer |
| 10,984,098 | B2 | 4/2021 | Lavi et al. |
| 10,997,293 | B2 | 5/2021 | Wiest et al. |
| 11,005,860 | B1 | 5/2021 | Glyer et al. |
| 11,016,954 | B1 | 5/2021 | Babocichin et al. |
| 11,044,118 | B1 | 6/2021 | Reed et al. |
| 11,055,414 | B2 | 7/2021 | Claes |
| 11,064,032 | B1 | 7/2021 | Yang et al. |
| 11,099,976 | B2 | 8/2021 | Khakare et al. |
| 11,102,231 | B2 | 8/2021 | Kraning et al. |
| 11,165,652 | B1 | 11/2021 | Byrne |
| 11,245,730 | B2 | 2/2022 | Bailey |
| 11,271,961 | B1 | 3/2022 | Berger |
| 11,334,670 | B2 | 5/2022 | Franco et al. |
| 11,336,555 | B2 | 5/2022 | Soh et al. |
| 11,366,897 | B1 | 6/2022 | Ramanathan et al. |
| 11,388,183 | B2 | 7/2022 | Hoopes et al. |
| 11,397,808 | B1 | 7/2022 | Prabhu et al. |
| 11,405,426 | B2 | 8/2022 | Nguyen |
| 11,418,528 | B2 | 8/2022 | Deardorff et al. |
| 11,442,989 | B2 | 9/2022 | Dvinov et al. |
| 11,444,974 | B1 | 9/2022 | Shakhzadyan |
| 11,483,317 | B1 | 10/2022 | Bolignano et al. |
| 11,496,498 | B2 | 11/2022 | Wright et al. |
| 11,496,519 | B1 | 11/2022 | Gupta et al. |
| 11,503,063 | B2 | 11/2022 | Rao |
| 11,507,672 | B1 | 11/2022 | Pagnozzi et al. |
| 11,509,658 | B1 * | 11/2022 | Kulkarni ............... H04W 12/60 |
| 11,516,222 | B1 | 11/2022 | Srinivasan et al. |
| 11,520,907 | B1 | 12/2022 | Borowiec et al. |
| 11,546,360 | B2 | 1/2023 | Woodford et al. |
| 11,556,659 | B1 | 1/2023 | Kumar et al. |
| 11,558,401 | B1 | 1/2023 | Vashisht et al. |
| 11,558,414 | B1 | 1/2023 | Nguyen |
| 11,558,423 | B2 | 1/2023 | Gordon et al. |
| 11,567,751 | B2 | 1/2023 | Cosentino et al. |
| 11,570,090 | B2 | 1/2023 | Shen et al. |
| 11,575,696 | B1 | 2/2023 | Ithal et al. |
| 11,606,378 | B1 | 3/2023 | Delpont et al. |
| 11,614,956 | B2 | 3/2023 | Tsirkin et al. |
| 11,645,390 | B2 | 5/2023 | Vijayvargiya et al. |
| 11,651,055 | B2 | 5/2023 | Regier et al. |
| 11,662,928 | B1 | 5/2023 | Kumar et al. |
| 11,663,340 | B2 | 5/2023 | Wu et al. |
| 11,669,386 | B1 | 6/2023 | Abrol |
| 11,695,785 | B2 | 7/2023 | Ithal et al. |
| 11,700,233 | B2 | 7/2023 | St. Pierre |
| 11,720,685 | B2 | 8/2023 | Gwilliams |
| 11,750,566 | B1 | 9/2023 | Montilla Lugo |
| 11,757,844 | B2 | 9/2023 | Xiao |
| 11,770,398 | B1 | 9/2023 | Erlingsson |
| 11,792,284 | B1 | 10/2023 | Nanduri |
| 11,799,874 | B1 | 10/2023 | Lichtenstein et al. |
| 11,803,766 | B1 | 10/2023 | Srinivasan |
| 11,831,670 | B1 | 11/2023 | Molls et al. |
| 11,836,250 | B2 | 12/2023 | Grossman et al. |
| 11,841,945 | B2 | 12/2023 | Fogel |
| 11,902,282 | B2 * | 2/2024 | Ghiold ................... H04L 63/20 |
| 11,914,707 | B1 | 2/2024 | Ramanathan et al. |
| 11,922,220 | B2 | 3/2024 | Haghighat et al. |
| 11,936,785 | B1 | 3/2024 | Shemesh et al. |
| 11,960,609 | B2 | 4/2024 | Gokhman et al. |
| 11,973,770 | B1 | 4/2024 | Miran et al. |
| 11,991,216 | B1 | 5/2024 | Venkatachari |

(56) References Cited

U.S. PATENT DOCUMENTS

| | | | |
|---|---|---|---|
| 12,003,541 B2 * | 6/2024 | Shulman | H04L 63/20 |
| 12,019,770 B2 | 6/2024 | Nilsson et al. | |
| 12,050,696 B2 | 7/2024 | Pieno et al. | |
| 12,058,177 B2 | 8/2024 | Crabtree et al. | |
| 12,063,305 B2 * | 8/2024 | Ip | G06N 20/00 |
| 12,164,652 B1 | 12/2024 | Li et al. | |
| 12,166,785 B2 | 12/2024 | Yellapragada et al. | |
| 2002/0184486 A1 | 12/2002 | Kershenbaum et al. | |
| 2003/0188194 A1 | 10/2003 | Currie et al. | |
| 2003/0217039 A1 | 11/2003 | Kurtz et al. | |
| 2005/0050365 A1 | 3/2005 | Seki et al. | |
| 2005/0071630 A1 | 3/2005 | Thornton et al. | |
| 2005/0251863 A1 | 11/2005 | Sima | |
| 2005/0283645 A1 | 12/2005 | Turner et al. | |
| 2007/0271360 A1 | 11/2007 | Sahita et al. | |
| 2008/0075283 A1 | 3/2008 | Takahashi | |
| 2008/0221833 A1 | 9/2008 | Brown et al. | |
| 2008/0307020 A1 | 12/2008 | Ko et al. | |
| 2009/0106256 A1 | 4/2009 | Safari et al. | |
| 2009/0271863 A1 | 10/2009 | Govindavajhala et al. | |
| 2010/0242082 A1 | 9/2010 | Keene et al. | |
| 2010/0263049 A1 | 10/2010 | Cross et al. | |
| 2010/0281275 A1 | 11/2010 | Lee et al. | |
| 2011/0035802 A1 | 2/2011 | Arajujo, Jr. et al. | |
| 2011/0055361 A1 | 3/2011 | Dehaan | |
| 2011/0276806 A1 | 11/2011 | Casper et al. | |
| 2012/0110651 A1 | 5/2012 | Van Biljon et al. | |
| 2012/0255003 A1 | 10/2012 | Sallam | |
| 2012/0297206 A1 | 11/2012 | Nord et al. | |
| 2012/0311696 A1 | 12/2012 | Datsenko et al. | |
| 2013/0054890 A1 | 2/2013 | Desai et al. | |
| 2013/0124669 A1 | 5/2013 | Anderson et al. | |
| 2013/0160119 A1 | 6/2013 | Sartin | |
| 2013/0160129 A1 | 6/2013 | Sartin | |
| 2014/0096134 A1 | 4/2014 | Barak | |
| 2014/0115578 A1 | 4/2014 | Cooper et al. | |
| 2014/0237537 A1 | 8/2014 | Manmohan | |
| 2014/0317677 A1 | 10/2014 | Vaidya | |
| 2014/0337613 A1 | 11/2014 | Martini | |
| 2015/0033305 A1 | 1/2015 | Shear | |
| 2015/0055647 A1 | 2/2015 | Roberts | |
| 2015/0058993 A1 | 2/2015 | Choi et al. | |
| 2015/0095995 A1 | 4/2015 | Bhalerao | |
| 2015/0150072 A1 | 5/2015 | Doctor et al. | |
| 2015/0163192 A1 | 6/2015 | Jain | |
| 2015/0172321 A1 | 6/2015 | Kirti et al. | |
| 2015/0254364 A1 | 9/2015 | Piduri et al. | |
| 2015/0310215 A1 | 10/2015 | McBride et al. | |
| 2015/0319160 A1 | 11/2015 | Ferguson et al. | |
| 2016/0063037 A1 | 3/2016 | Savkli | |
| 2016/0078231 A1 | 3/2016 | Bach et al. | |
| 2016/0103669 A1 | 4/2016 | Gamage et al. | |
| 2016/0105454 A1 | 4/2016 | Li | |
| 2016/0140352 A1 | 5/2016 | Nickolov | |
| 2016/0156664 A1 | 6/2016 | Nagaratnam | |
| 2016/0224600 A1 | 8/2016 | Munk | |
| 2016/0299708 A1 | 10/2016 | Yang et al. | |
| 2016/0366185 A1 | 12/2016 | Lee et al. | |
| 2017/0026416 A1 | 1/2017 | Carpenter et al. | |
| 2017/0034198 A1 | 2/2017 | Powers et al. | |
| 2017/0070506 A1 | 3/2017 | Reddy | |
| 2017/0104755 A1 | 4/2017 | Arregoces | |
| 2017/0111384 A1 | 4/2017 | Loureiro et al. | |
| 2017/0163650 A1 * | 6/2017 | Seigel | H04L 63/102 |
| 2017/0180421 A1 | 6/2017 | Shieh et al. | |
| 2017/0185784 A1 | 6/2017 | Madou | |
| 2017/0187686 A1 | 6/2017 | Shaikh et al. | |
| 2017/0187743 A1 | 6/2017 | Madou | |
| 2017/0200122 A1 | 7/2017 | Edson et al. | |
| 2017/0223024 A1 * | 8/2017 | Desai | H04L 63/20 |
| 2017/0230179 A1 | 8/2017 | Mannan et al. | |
| 2017/0237560 A1 | 8/2017 | Mueller et al. | |
| 2017/0257347 A1 | 9/2017 | Yan | |
| 2017/0285978 A1 | 10/2017 | Manasse | |
| 2017/0300690 A1 | 10/2017 | Ladnai et al. | |
| 2017/0374136 A1 | 12/2017 | Ringdahl | |
| 2018/0004950 A1 | 1/2018 | Gupta et al. | |
| 2018/0026995 A1 | 1/2018 | Dufour et al. | |
| 2018/0027009 A1 | 1/2018 | Santos | |
| 2018/0063290 A1 | 3/2018 | Yang et al. | |
| 2018/0081640 A1 | 3/2018 | Collins | |
| 2018/0101622 A1 | 4/2018 | Helvik et al. | |
| 2018/0137174 A1 | 5/2018 | Cahana et al. | |
| 2018/0150412 A1 | 5/2018 | Manasse | |
| 2018/0159882 A1 | 6/2018 | Brill | |
| 2018/0181310 A1 | 6/2018 | Feinberg et al. | |
| 2018/0191726 A1 | 7/2018 | Luukkala | |
| 2018/0219888 A1 | 8/2018 | Apostolopoulos | |
| 2018/0234459 A1 | 8/2018 | Kung | |
| 2018/0239902 A1 | 8/2018 | Godard | |
| 2018/0248902 A1 | 8/2018 | Dänilä-Dumitrescu et al. | |
| 2018/0260566 A1 | 9/2018 | Chaganti et al. | |
| 2018/0270268 A1 | 9/2018 | Gorodissky et al. | |
| 2018/0278639 A1 | 9/2018 | Bernstein et al. | |
| 2018/0288129 A1 | 10/2018 | Joshi et al. | |
| 2018/0307736 A1 | 10/2018 | Balakrishnan et al. | |
| 2018/0309747 A1 | 10/2018 | Sweet et al. | |
| 2018/0321993 A1 | 11/2018 | McClory | |
| 2018/0341768 A1 | 11/2018 | Marshall et al. | |
| 2018/0349612 A1 | 12/2018 | Harel et al. | |
| 2018/0359058 A1 | 12/2018 | Kurian | |
| 2018/0359059 A1 | 12/2018 | Kurian | |
| 2018/0367548 A1 | 12/2018 | Stokes, III et al. | |
| 2019/0007271 A1 | 1/2019 | Rickards et al. | |
| 2019/0018961 A1 | 1/2019 | Kostyushko et al. | |
| 2019/0043201 A1 | 2/2019 | Strong et al. | |
| 2019/0058722 A1 | 2/2019 | Levin et al. | |
| 2019/0068617 A1 | 2/2019 | Coleman | |
| 2019/0068627 A1 | 2/2019 | Thampy | |
| 2019/0081963 A1 | 3/2019 | Waghorn | |
| 2019/0089720 A1 | 3/2019 | Aditham et al. | |
| 2019/0095626 A1 | 3/2019 | Mohan | |
| 2019/0104140 A1 | 4/2019 | Gordeychik et al. | |
| 2019/0116111 A1 | 4/2019 | Izard et al. | |
| 2019/0121986 A1 | 4/2019 | Stopel et al. | |
| 2019/0132350 A1 | 5/2019 | Smith et al. | |
| 2019/0149604 A1 | 5/2019 | Jahr | |
| 2019/0166129 A1 | 5/2019 | Gaetjen et al. | |
| 2019/0171811 A1 | 6/2019 | Daniel et al. | |
| 2019/0191417 A1 | 6/2019 | Baldemair et al. | |
| 2019/0205267 A1 | 7/2019 | Richey et al. | |
| 2019/0207966 A1 | 7/2019 | Vashisht et al. | |
| 2019/0220298 A1 | 7/2019 | Jiao et al. | |
| 2019/0220575 A1 | 7/2019 | Boudreau et al. | |
| 2019/0229915 A1 | 7/2019 | Digiambattista et al. | |
| 2019/0235900 A1 | 8/2019 | Singh et al. | |
| 2019/0236409 A1 | 8/2019 | Van Der Stockt et al. | |
| 2019/0245883 A1 | 8/2019 | Gorodissky et al. | |
| 2019/0260764 A1 | 8/2019 | Humphrey et al. | |
| 2019/0266508 A1 | 8/2019 | Bunyk et al. | |
| 2019/0278928 A1 | 9/2019 | Rungta et al. | |
| 2019/0327258 A1 | 10/2019 | Choi et al. | |
| 2019/0327271 A1 | 10/2019 | Saxena et al. | |
| 2019/0334715 A1 | 10/2019 | Gray | |
| 2019/0354675 A1 | 11/2019 | Gan et al. | |
| 2019/0377988 A1 | 12/2019 | Qi et al. | |
| 2020/0007314 A1 | 1/2020 | Vouk et al. | |
| 2020/0007569 A1 | 1/2020 | Dodge et al. | |
| 2020/0012818 A1 | 1/2020 | Levin et al. | |
| 2020/0028862 A1 | 1/2020 | Lin | |
| 2020/0044916 A1 | 2/2020 | Kaufman et al. | |
| 2020/0050440 A1 | 2/2020 | Chuppala et al. | |
| 2020/0074360 A1 | 3/2020 | Humphries et al. | |
| 2020/0082094 A1 | 3/2020 | McAllister et al. | |
| 2020/0106782 A1 | 4/2020 | Sion | |
| 2020/0117434 A1 | 4/2020 | Biskup et al. | |
| 2020/0125352 A1 | 4/2020 | Kannan | |
| 2020/0137097 A1 | 4/2020 | Zimmermann et al. | |
| 2020/0137125 A1 | 4/2020 | Patnala et al. | |
| 2020/0145405 A1 | 5/2020 | Bosch et al. | |
| 2020/0186416 A1 | 6/2020 | Hashimoto et al. | |
| 2020/0244678 A1 | 7/2020 | Shua | |
| 2020/0244692 A1 | 7/2020 | Shua | |
| 2020/0259852 A1 | 8/2020 | Wolff et al. | |

(56) References Cited

U.S. PATENT DOCUMENTS

| | | | |
|---|---|---|---|
| 2020/0320189 A1 | 10/2020 | Zhang et al. |
| 2020/0320845 A1 | 10/2020 | Livny et al. |
| 2020/0336489 A1 | 10/2020 | Wuest et al. |
| 2020/0382556 A1 | 12/2020 | Woolward et al. |
| 2020/0387357 A1 | 12/2020 | Mathon et al. |
| 2020/0389431 A1 | 12/2020 | St. Pierre |
| 2020/0389469 A1 | 12/2020 | Litichever et al. |
| 2020/0409741 A1 | 12/2020 | Dornemann et al. |
| 2021/0014265 A1 | 1/2021 | Hadar et al. |
| 2021/0026932 A1 | 1/2021 | Boudreau et al. |
| 2021/0042263 A1 | 2/2021 | Zdornov et al. |
| 2021/0056548 A1 | 2/2021 | Monica et al. |
| 2021/0089662 A1 | 3/2021 | Muniswamy-Reddy et al. |
| 2021/0105304 A1 | 4/2021 | Kraning et al. |
| 2021/0144517 A1 | 5/2021 | Guim Bernat et al. |
| 2021/0149788 A1 | 5/2021 | Downie |
| 2021/0158835 A1 | 5/2021 | Hill et al. |
| 2021/0168150 A1 | 6/2021 | Ross et al. |
| 2021/0173939 A1 | 6/2021 | Kotler et al. |
| 2021/0176123 A1 | 6/2021 | Plamondon |
| 2021/0176164 A1 | 6/2021 | Kung et al. |
| 2021/0185073 A1 | 6/2021 | Ewaida et al. |
| 2021/0194678 A1 | 6/2021 | Schindewolf et al. |
| 2021/0200881 A1 | 7/2021 | Joshi et al. |
| 2021/0203684 A1 | 7/2021 | Maor et al. |
| 2021/0203761 A1 | 7/2021 | Ahn et al. |
| 2021/0211453 A1 | 7/2021 | Cooney et al. |
| 2021/0216591 A1 | 7/2021 | Dvinov et al. |
| 2021/0216630 A1 | 7/2021 | Karr |
| 2021/0218567 A1 | 7/2021 | Richards et al. |
| 2021/0226812 A1 | 7/2021 | Park |
| 2021/0226928 A1 | 7/2021 | Crabtree et al. |
| 2021/0232344 A1 | 7/2021 | Corrie |
| 2021/0234889 A1 | 7/2021 | Burle et al. |
| 2021/0248443 A1 | 8/2021 | Shu et al. |
| 2021/0263802 A1 | 8/2021 | Gottemukkula et al. |
| 2021/0297447 A1 | 9/2021 | Crabtree et al. |
| 2021/0306416 A1 | 9/2021 | Mukhopadhyay et al. |
| 2021/0314342 A1 | 10/2021 | Oberg |
| 2021/0320794 A1 | 10/2021 | Auh et al. |
| 2021/0329019 A1 | 10/2021 | Shua et al. |
| 2021/0334386 A1 | 10/2021 | AlGhamdi et al. |
| 2021/0357246 A1 | 11/2021 | Kumar et al. |
| 2021/0360032 A1 | 11/2021 | Crabtree et al. |
| 2021/0368045 A1 | 11/2021 | Verma |
| 2021/0382995 A1 | 12/2021 | Massiglia et al. |
| 2021/0382997 A1 | 12/2021 | Yi et al. |
| 2021/0400071 A1 | 12/2021 | Ray et al. |
| 2021/0406365 A1 | 12/2021 | Neil et al. |
| 2021/0409486 A1 | 12/2021 | Martinez |
| 2022/0004410 A1 | 1/2022 | Chen |
| 2022/0012771 A1 | 1/2022 | Gustafson |
| 2022/0030020 A1 | 1/2022 | Huffman |
| 2022/0035862 A1 | 2/2022 | Ben-Natan |
| 2022/0036302 A1 | 2/2022 | Cella et al. |
| 2022/0053011 A1 | 2/2022 | Rao et al. |
| 2022/0060497 A1 | 2/2022 | Crabtree et al. |
| 2022/0086173 A1 | 3/2022 | Yavo et al. |
| 2022/0100869 A1 | 3/2022 | Berger et al. |
| 2022/0131888 A1 | 4/2022 | Kanso |
| 2022/0138512 A1 | 5/2022 | Saillet et al. |
| 2022/0156396 A1 | 5/2022 | Bednash et al. |
| 2022/0164111 A1 | 5/2022 | Yang et al. |
| 2022/0179964 A1 | 6/2022 | Qiao et al. |
| 2022/0182403 A1 | 6/2022 | Mistry |
| 2022/0188273 A1 | 6/2022 | Koorapati et al. |
| 2022/0188689 A1 | 6/2022 | Gunawardana et al. |
| 2022/0197926 A1 | 6/2022 | Passey et al. |
| 2022/0210053 A1 | 6/2022 | Du |
| 2022/0215101 A1 | 7/2022 | Rioux et al. |
| 2022/0232024 A1 | 7/2022 | Kapoor |
| 2022/0232042 A1 | 7/2022 | Crabtree et al. |
| 2022/0247791 A1 | 8/2022 | Duminuco et al. |
| 2022/0263656 A1 | 8/2022 | Moore |
| 2022/0284362 A1 | 9/2022 | Bellinger et al. |
| 2022/0309166 A1 | 9/2022 | Shenoy et al. |
| 2022/0326861 A1 | 10/2022 | Shachar et al. |
| 2022/0326941 A1 | 10/2022 | Nelson et al. |
| 2022/0327119 A1 | 10/2022 | Gasper et al. |
| 2022/0335340 A1 | 10/2022 | Moustafa et al. |
| 2022/0342690 A1 | 10/2022 | Shua |
| 2022/0342997 A1 | 10/2022 | Watanabe et al. |
| 2022/0345480 A1 | 10/2022 | Shua |
| 2022/0345481 A1 | 10/2022 | Shua |
| 2022/0350931 A1 | 11/2022 | Shua |
| 2022/0357992 A1 | 11/2022 | Karpovsky |
| 2022/0358233 A1 | 11/2022 | Thakur et al. |
| 2022/0360958 A1 | 11/2022 | Cui et al. |
| 2022/0374519 A1 | 11/2022 | Botelho et al. |
| 2022/0400128 A1 | 12/2022 | Kfir et al. |
| 2022/0407841 A1 | 12/2022 | Karpowicz |
| 2022/0407889 A1 | 12/2022 | Narigapalli et al. |
| 2022/0413879 A1 | 12/2022 | Passey et al. |
| 2022/0414103 A1 | 12/2022 | Upadhyay et al. |
| 2022/0417011 A1 | 12/2022 | Shua |
| 2022/0417219 A1 | 12/2022 | Sheriff |
| 2023/0007014 A1 | 1/2023 | Narayan |
| 2023/0011957 A1 | 1/2023 | Panse et al. |
| 2023/0019015 A1 | 1/2023 | Ahmed |
| 2023/0027210 A1 | 1/2023 | Shelton, IV et al. |
| 2023/0032686 A1 | 2/2023 | Williams et al. |
| 2023/0036145 A1 | 2/2023 | Ramachandran et al. |
| 2023/0040635 A1 | 2/2023 | Narayan |
| 2023/0075355 A1 | 3/2023 | Twigg |
| 2023/0087093 A1 | 3/2023 | Ithal et al. |
| 2023/0095756 A1 | 3/2023 | Wilkinson et al. |
| 2023/0102103 A1 | 3/2023 | Mazumder et al. |
| 2023/0110080 A1 | 4/2023 | Hen |
| 2023/0114821 A1 | 4/2023 | Thomas et al. |
| 2023/0123477 A1 | 4/2023 | Luttwak et al. |
| 2023/0125134 A1 | 4/2023 | Raleigh et al. |
| 2023/0134674 A1 | 5/2023 | Quinn et al. |
| 2023/0135240 A1 | 5/2023 | Cody et al. |
| 2023/0136839 A1 | 5/2023 | Sundararajan et al. |
| 2023/0161614 A1 | 5/2023 | Herzberg et al. |
| 2023/0161870 A1 | 5/2023 | Herzberg et al. |
| 2023/0164148 A1 | 5/2023 | Narayan |
| 2023/0164164 A1 | 5/2023 | Herzberg et al. |
| 2023/0164182 A1 | 5/2023 | Kothari et al. |
| 2023/0169165 A1 | 6/2023 | Williams et al. |
| 2023/0171271 A1 | 6/2023 | Williams et al. |
| 2023/0192418 A1 | 6/2023 | Horowitz et al. |
| 2023/0208855 A1 | 6/2023 | Sheriff et al. |
| 2023/0208870 A1 | 6/2023 | Yellapragada et al. |
| 2023/0224319 A1 | 7/2023 | Isoyama et al. |
| 2023/0229764 A1 | 7/2023 | Vohra et al. |
| 2023/0231867 A1 | 7/2023 | Rampura Venkatachar |
| 2023/0237068 A1 | 7/2023 | Sillifant et al. |
| 2023/0254330 A1 | 8/2023 | Singh |
| 2023/0297666 A1 | 9/2023 | Atamli et al. |
| 2023/0325814 A1 | 10/2023 | Vijayan et al. |
| 2023/0336550 A1 | 10/2023 | Lidgi et al. |
| 2023/0336578 A1 | 10/2023 | Lidgi et al. |
| 2023/0376586 A1 | 11/2023 | Shemesh et al. |
| 2024/0007492 A1 | 1/2024 | Shen et al. |
| 2024/0037229 A1 | 2/2024 | Pab?n et al. |
| 2024/0045838 A1 | 2/2024 | Reiss et al. |
| 2024/0073115 A1 | 2/2024 | Chakraborty et al. |
| 2024/0080329 A1 | 3/2024 | Reed et al. |
| 2024/0080332 A1 | 3/2024 | Ganesh et al. |
| 2024/0146818 A1 | 5/2024 | Cody et al. |
| 2024/0202359 A1* | 6/2024 | Shukla .................... G06F 21/54 |
| 2024/0241752 A1 | 7/2024 | Crabtree et al. |
| 2024/0259396 A1* | 8/2024 | Kerkar ................ H04L 63/1416 |
| 2024/0370880 A1 | 11/2024 | Jeske et al. |
| 2025/0055870 A1* | 2/2025 | Viswambharan ....... H04L 63/08 |
| 2025/0086280 A1 | 3/2025 | Murphy et al. |

FOREIGN PATENT DOCUMENTS

| | | | |
|---|---|---|---|
| CN | 112989379 A | 6/2021 |
| EP | 4254869 A2 | 10/2023 |
| JP | 2017120492 A | 7/2017 |
| RU | 2421792 C2 | 6/2011 |

(56)                References Cited

FOREIGN PATENT DOCUMENTS

| SG | 10202009702X | 4/2021 |
| SG | 11202103226 U | 4/2021 |
| WO | 2004034184 A2 | 4/2004 |

OTHER PUBLICATIONS

Leibenger, Dominik et al. EncFS goes multi-user: Adding access control to an encrypted file system. 2016 IEEE Conference on Communications and Network Security (CNS). https://ieeexoplore. ieee.org/stamp/stamp.jsp?tp=&arnumber=7860544 (Year: 2016).

Siqi Ma; Certified Copy? Understanding Security Risks of Wi-Fi Hotspot based Android Data Clone Services; ACM; Year: 2021; pp. 320-331.

Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.ieee.org/stamp/stamp.jsp?tp= &arnumber=8416506 (Year: 2018).

Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.ieee.org/stamp/ stamp. jsp?tp=&arnumber=9014355 (Year: 2019).

Safaryan, Olga A et al. Cryptographic Algorithm Implementation for Data Encryption in DBMS MS SQL Server. 2020 IEEE East-West Design & Test Symposium (EWDTS). https://ieeexplore.ieee. org/stamp/stamp.jsp?tp=&arnumber=9224775 (Year: 2020).

Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.ieee.org/stamp/ stamp.jsp?tp= &arnumber=9250645 (Year: 2020).

International Search Report for PCT/IB2023/050848, dated May 9, 2023. International Bureau of WIPO.

Written Opinion of the Searching Authority for PCT/IB2023/ 050848, dated May 9, 2023. International Bureau of WIPO.

No stated author; Downdetector; 2020; retrieved from the Internet https://web.archive.org/web/20201226001244/https://downdetector. com/; pp. 1-8, as printed. (Year: 2020).

No stated author; How to Run a Ping Test (Windows) 2020; retrieved from the Internet https://web.archive.org/web/ 20200811194856/https://support.shaw.ca/t5/internet-articles/how-to-run-a-ping-test-windows/ta-p/6677; pp. 1-6 as printed. (Year: 2020).

No stated author; IsItoownRightNow; 2020; retrieved from the Internet https://web.archive.org/web/20201202121557/ https://www. isitdownrightnow.com/; pp. 1-2 as printed. (Year: 2020).

Ali Gholami; Security and Privacy of Sensitive Data in Cloud Computing: a Survey of Recent Developments; ARIX:2016; pp. 131-150.

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp. jsp?tp=&arnumber=8567979 (Year: 2019).

Henry Hanping Feng; Anomaly Detection Using Call Stack Information; IEEE: Year:2003; pp. 1-14.

International Search Report for PCT Application No. PCT/IB2022/ 060940 dated Feb. 1, 2023. The International Bureau of WIPO.

International Search Report of PCT/IB2023/058074, dated Nov. 20, 2023. Searching Authority United States Patent and Trademark Office, Alexandria, Virginia.

International Search Report, PCT/IB23/55312. ISA/US, Commissioner for Patents, Alexandria, Virginia. Dated Aug. 30, 2023.

Kumar, Anuj et al. A New Approach for Security in Cloud Data Storage for IOT Applications Using Hybrid Cryptography Technique. 2020 International Conference on Power Electronics & IoT Applications in Renewable Energy and its Control. https:// ieeexplore. ieee.org/stamp/stamp.jsp?tp=&arnumber=9087010 (Year: 2020).

Microsoft Build. "Introduction to Azure managed disks". Aug. 21, 2023, https://docs.microsoft.com/en-us/azure/virtual-machines/ managed-disks-overview.

Microsoft Docs. "Create a VM from a managed image". Article. Jan. 5, 2022. https://docs.microsoft.com/en-us/azure/virtual-machines/ windows/create-vm-generalized-managed.

Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp? tp=&arnumber=7819669 (Year: 2016).

Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/ stamp/stamp.jsp?tp=&arnumber=9356962 (Year: 2020).

Written Opinion of the International Searching Authority for PCT Application No. PCT/IB2022/060940 dated Feb. 1, 2023. The International Bureau of WIPO.

Written Opinion of the International Searching Authority, PCT/ IB23/55312. ISA/US Commissioner for Patents, Alexandria, Virginia. Dated Aug. 30, 2023.

Written Opinion of the Searching Authority of PCT/IB2023/ 058074, dated Nov. 20, 2023. Searching Authority United States Patent and Trademark Office, Alexandria, Virginia.

Zhang et al. BMC Bioinformatics 2014. "On finding bicliques in bipartite graphs: a novel algorithm and its application to the integration of diverse biological data types". http://www.biomedcentral. com/1471-2105/15/110.

Sahil Suneja; Safe Inspection of Live Virtual Machines; IEEE; Year:2017; pp. 97-111.

AWS, AWS managed policies for job functions, Oct. 26, 2021, https://web.archive.org/web/20211026212847/https:// docs.aws. amazon.com/IAM/latesUUserGuide/access_policiesjob-functions. html (Year: 2021).

Christie Koehler, Detecting and Managing Drift with Terraform, Jun. 7, 2018, https://www.hashicorp.com/en/blog/detecting-and-managing-drift-with-terraform (Year: 2018).

Extended European Search Report for EP 23746586.9 dated Jul. 23, 2025. European Patent Office, Munich, Germany.

Github, Complete EC2 Instance, Aug. 27, 2021, https://github.com/ terraform-aws-modules/terraform-aws-ec2-instance/tree/ 528613d4580f2c1266e87d8d24fc25bf5290fe2c/examples/ complete (Year: 2021).

Github, Complete EC2 Instance, Aug. 27, 2021, https://github.com/ terraform-aws-modules/terraform-aws-ec2-instance/tree/ 528613d4580f2c1266e87d8d24fc25bf5290fe2c/examples/complete/ main.tf (Year: 2021).

Google, Shift security left with on-demand vulnerability scanning, Aug. 25, 2021 https://cloud.google.com/blog/products/identity-security/scan-for-vulnerabilities-early-to-shift-security-left-in-cicd (Year: 2021).

Proxify, Mastering good programming practices: A comprehensive guide, Apr. 27, 2021, https://proxify.io/articles/good-programming-practices (Year: 2021).

Reddit, 1AM Roles for each Lambda?, Aug. 25, 2019 (Year: 2019).

* cited by examiner

```
resource "aws_instance" "tfvm" {
    ami = "ami-0885b1f6bd170450c"
    instance_type = "t2.micro"
    vpc_security_group_ids = [ aws_security_group.websg.id ]
```

SYSTEM AND METHOD FOR DETECTING EXCESSIVE PERMISSIONS IN IDENTITY AND ACCESS MANAGEMENT

CROSS-REFERENCE TO RELATED APPLICATIONS

This application is a continuation in part of U.S. Non-Provisional patent application Ser. No. 18/055,180 filed Nov. 14, 2022, which claims the benefit of U.S. Provisional Application No. 63/264,550 filed on Nov. 24, 2021, U.S. Provisional Application No. 63/283,376 filed on Nov. 26, 2021, U.S. Provisional Application No. 63/283,378 filed on Nov. 26, 2021, and U.S. Provisional Application No. 63/283,379 filed on Nov. 26, 2021, the contents of which are hereby incorporated by reference. This application also claims the benefit of U.S. Provisional Patent Application No. 63/267,368 filed Jan. 31, 2022, the contents of which are hereby incorporated by reference. All of the applications referenced above are hereby incorporated by reference.

TECHNICAL FIELD

The present disclosure relates generally to cybersecurity and, in particular, to improved scanning of virtual instances utilizing infrastructure as code.

BACKGROUND

As users migrate data storage, processing, and management tasks to decentralized, off-location devices, platforms, and services, the limitations of such devices, platforms, and services, also referred to as cloud environments, platforms, and the like, may impact a user's data operations. Specifically, vulnerabilities within cloud-deployed resources and processes may present unique challenges requiring remediation. Due to the scale and structure of cloud systems, detection of workload vulnerabilities, which detection may be readily-provided in non-cloud deployments, may require numerous, complex tools and operations.

Current solutions to cloud workload vulnerability scanning challenges require the deployment of specialized tools, including scanning agents directed to maintenance of virtual machines (VMs), where operation and maintenance of such tools may be costly, time-consuming, or both. Agent-dependent processes fail to provide for scanning of containers, such as containers managed using Kubernetes®, and other, like, container-management platforms, and may fail to provide for coverage of serverless applications. Where such agent-implementation processes fail to provide for full cloud workload vulnerability scanning, additional methods, such as snapshot-based scanning, may supplement implemented solutions.

Snapshot-based scanning, wherein static "snapshots" of processes, services, data, and the like, are analyzed in an environment separate from the source environment, provides for agentless scanning. Snapshot-based scanning is applied in various fields, including computer forensics, to provide for analysis of services, processes, data, and the like, in locations or environments other than those from which the snapshots are collected, as well as retrospective analysis. However, the applicability of snapshot-based scanning is limited in multi-tenant systems, such as shared cloud platforms, as cloud tenants may desire high levels of data protection during snapshot generation, transfer, and analysis. Further, snapshot-based scanning methods, as well as hybrid methods including both agent-implemented and snapshot-based methods, may be inapplicable to certain cloud system structures and environments, which may include various objects, processes, and the like, which such methods may not be configured to process, as such processing may require, as examples, separate analysis of container repositories, VM snapshots, and application programming interfaces (API) for serverless applications, where existing solutions fail to provide such integrated functionality.

Further complicating matters is the deployment of cloud environments utilizing infrastructure as code (IaC) systems. While aimed at decreasing human error when deploying cloud environments, there is often a drift from the original configuration code to the current state of the production environment. A complication may arise due, for example, to different teams working on the development environment (configuration code) and the production environment (deployed instances). Current tools such as Checkov and Accurics allow scanning for misconfigurations and policy violations, but are limited to scanning only configuration code. CI/CD (continuous integration/continuous deployment) and drifting configurations mean that scanning the configuration code is not always enough to get a precise understanding of where threats and vulnerabilities currently exist, since this is a moving target.

It is apparent that it would be advantageous to provide a solution that can scan for vulnerabilities in an improved and efficient manner.

Furthermore, it would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting a vulnerable code object in configuration code for deploying instances in a cloud computing environment. The method comprises: accessing a configuration code, the configuration code including a plurality of code objects, where a code object of the plurality of code objects corresponds to a deployed principal in the cloud computing environment; detecting in a log a plurality of access events, each access event associated with a first principal deployed in the cloud computing environment based on a first code object of the plurality of code objects; determining that the first code object includes a permission which is not utilized in any of the plurality of access events; and initiating a mitigation action for the first principal based on the permission.

Certain embodiments disclosed herein also include a non-transitory computer readable medium having stored thereon causing a processing circuitry to execute a process, the process comprising: accessing a configuration code, the configuration code including a plurality of code objects, where a code object of the plurality of code objects corresponds to a deployed principal in the cloud computing environment; detecting in a log a plurality of access events, each access event associated with a first principal deployed in the cloud computing environment based on a first code object of the plurality of code objects; determining that the first code object includes a permission which is not utilized in any of the plurality of access events; and initiating a mitigation action for the first principal based on the permission.

Certain embodiments disclosed herein also include a system for detecting a vulnerable code object in configuration code for deploying instances in a cloud computing environment. The system comprises: a processing circuitry; and a memory, the memory containing instructions that, when executed by the processing circuitry, configure the system to: access a configuration code, the configuration code including a plurality of code objects, where a code object of the plurality of code objects corresponds to a deployed principal in the cloud computing environment; detect in a log a plurality of access events, each access event associated with a first principal deployed in the cloud computing environment based on a first code object of the plurality of code objects; determine that the first code object includes a permission which is not utilized in any of the plurality of access events; and initiate a mitigation action for the first principal based on the permission.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 6 is network log of a cloud computing environment, in accordance with an embodiment.

DETAILED DESCRIPTION

Figure 1:
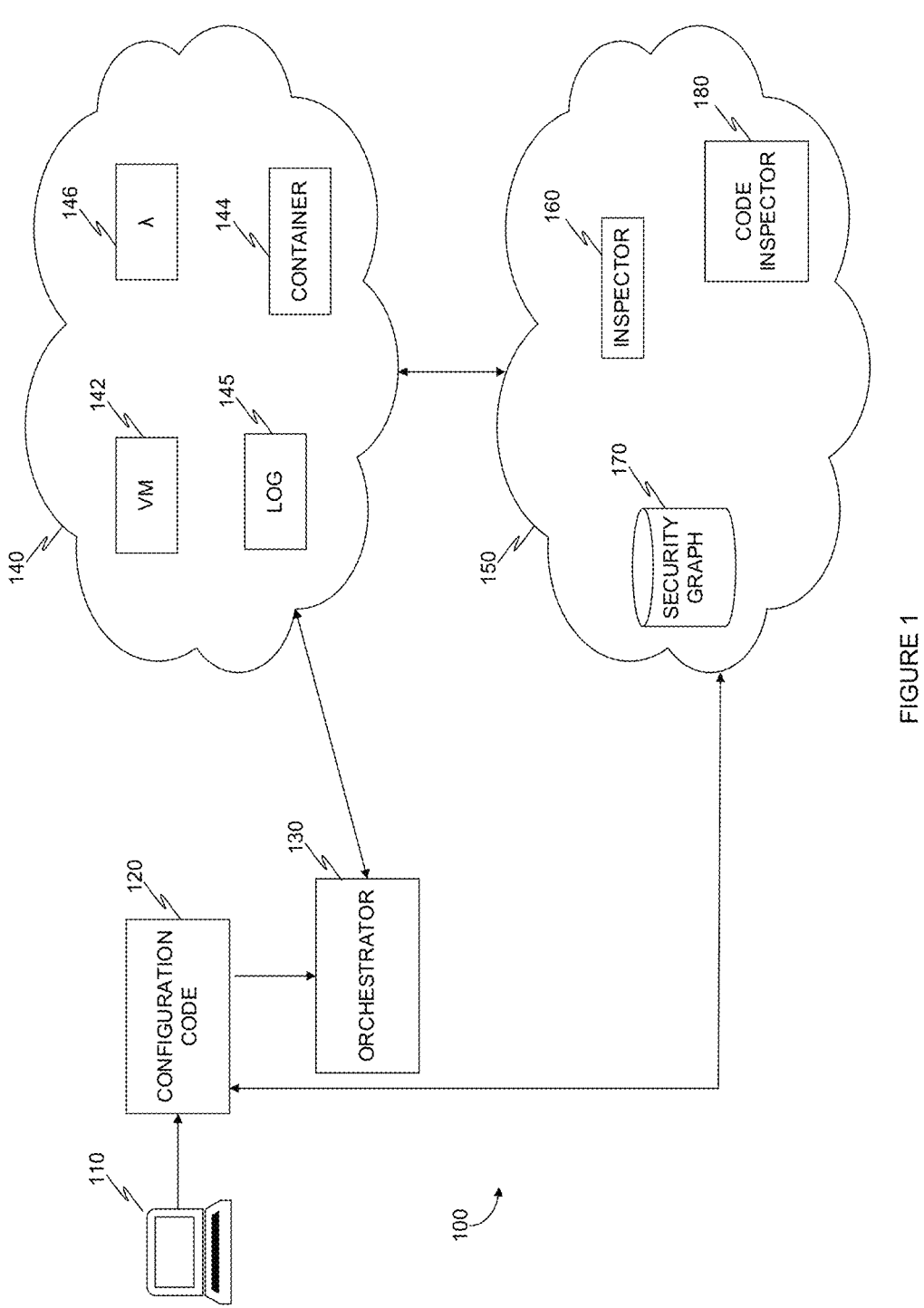
FIG. 1 is a network diagram of a monitored cloud computing environment utilizing infrastructure as code (IaC) utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Infrastructure as code (IaC) allows fast and reliable deployment of workloads and accounts in cloud based computing environments. A workload may be, for example, a virtual machine, a container, or a serverless function. A virtual machine may be implemented for example as an Oracle® VM VirtualBox hypervisor, a container may be implemented on a Kubernetes® platform, and serverless function may be implemented as Amazon® Web Services (AWS) Lambda. Accounts may be user accounts, service accounts, roles, and the like.

Typically, the deployed environment, also known as a production environment, differs over time from the initial deployment configuration, due for example, to upgrades and patches implemented in production but not continuously updated in configuration code. This can occur, for example, due to human error. Furthermore, many deployment environments utilize a continuous integration, continuous deployment (CI/CD) approach, for which a plurality of deployment environments are used. A cloud computing environment is designed, in an embodiment, utilizing infrastructure as code tool and other development tools in a development (i.e., dev) environment, and deployed to a test environment where code is tested. In an embodiment, code which passes tests, benchmarks, and the like, is then deployed to a staging environment which is similar to the production environment. In each of these environments, a single code object can correspond to multiple machines which are deployed based on the code object, each of which can be host to cybersecurity vulnerabilities. For example, a code object includes a code instruction that when executed to deploy a workload, configures a workload having a misconfiguration. If the misconfiguration is detected and corrected in the production environment, the code remains faulty and therefore the next machine deployed based off of the code will also have a misconfiguration.

In an embodiment, a security graph includes a representation of a production environment. The security graph is utilized in inspecting the configuration code to ascertain that code objects comply with the specification of the production environment. For example, the security graph is queried, in an embodiment, to detect a node representing a workload, which corresponds to an identifier of a code object. By utilizing information represented in the security graph of the production environment and applying it to code objects, cybersecurity threats can be detected faster, and to the point where they originate.

Alerts may be generated to indicate that the configuration code would result in a new production environment that is deficient, for example, due to vulnerability, when compared with the current production environment.

While declaratory code is precisely used because such code is intuitive for humans to read and write declaratory code, it should be appreciated that inspecting such code for cybersecurity issues is not a task that can be performed by humans. Specifically, inspecting code to detect a cybersecurity issue needs to be performed in a reliable and consistent manner, and done so repeatedly over often thousands of lines of code. Even if it were practical for a human to read through thousands of lines of computer code within any meaningful time frame (cloud computing environments are elastic and constantly changing), doing so while searching for hundreds of thousands of various cybersecurity issues is impossible. Furthermore, humans are not capable of performing such tasks repeatedly and reliably, as they apply objective standards to what is a cybersecurity issue.

By contrast, an embodiment of the system disclosed herein, applies objective criteria in detection of cybersecurity issues, and does so in a manner which is reliable, consistent, and in a timeframe which is relevant to the operation of a cloud computing environment. Additionally, methods disclosed herein provide for improved efficiency of computer systems, by reducing use of memory, processors, and the like.

FIG. 1 is a network diagram 100 of a monitored cloud computing environment utilizing infrastructure as code (IaC) utilized to describe the various embodiments.

A client device 110 generates a configuration code file 120 based on input from one or more users (e.g., software programmers). In an embodiment, a client device is a personal computer, a tablet, a laptop, and the like. In some embodiment, a client device 110 is used to access a server (not shown) which provides a computing environment into which input can be provided. It should be apparent that the client device 110 is shown here for simplicity and pedagogical purposes, and that the configuration code file 120 is generated, in other embodiments, by the client device, a virtual workload in a cloud computing environment, a combination thereof, and the like. In certain embodiments, the configuration code file 120 is generated by multiple different client devices. For example, a plurality of users may each utilize a different client device and update a single configuration code file 120, for example, with code objects. In some embodiments, a single client device 110 generates multiple configuration code files.

In an embodiment, the configuration code file 120 is implemented in a declaratory computer language. In a declaratory computer language, a user declares resources they would like to have as code objects, and an orchestrator, such as orchestrator 130, is configured to deploy workloads in a cloud computing environment based on the declarations. For example, an orchestrator 130 is configured, in an embodiment, to translate a declaratory code to a configuration code, which includes instructions which when executed configure a cloud computing environment to deploy a workload, virtual instance, and the like.

In certain embodiments, multiple configuration code files 120 may be utilized. For example, a user may operate multiple cloud environments, each with its own configuration code. For example, a first configuration code file is directed to deploying a cloud computing environment over Microsoft® Azure, while a second configuration code file is directed to deploying a cloud computing environment over Amazon® Web Services (AWS).

As another example, a user can declare a first resource type (e.g., virtual machine) for a first cloud environment (e.g., AWS) and for a second cloud environment (Google® Cloud Platform—GCP) in a first configuration code file, and a second resource type (e.g., software container) for the first cloud environment (AWS) and the second cloud environment (GCP) in a second configuration code file.

In an embodiment, an orchestrator 130 is configured to receive the configuration code file 120. In certain embodiments, the orchestrator 130 is configured to initiate actions in a cloud computing environment 140, for example, to deploy workloads, instances, user accounts, service accounts, combinations thereof, and the like, based on declarations of the configuration code file 120. In an embodiment, an instance is a virtual instance, and may be, for example a virtual machine 142, software container 144, a serverless function 146, and the like. A virtual machine 142 is implemented, according to an embodiment, as an Oracle® VirtualBox®. A software container 144 is implemented, for example, utilizing a Docker® container engine, a Kubernetes® platform, and the like, according to an embodiment. According to some embodiments, a serverless function is implemented as an Amazon® Lambda® serverless function.

In certain embodiments, a resource, principal, and the like cloud entities generate an event in the cloud computing environment 140. For example, a principal accessing a resource is an event, a resource communicating with another resource is an event, etc. Events are recorded in a log, for example, based on predefined data structures, according to an embodiment.

For example, a predefined structure for recording an event where a first resource sends a second resource a communication includes, according to an embodiment, data fields such as a timestamp, a source, a destination, a number of packets, a latency measurement, a TTL, a combination thereof, and the like.

In some embodiments, the orchestrator 130 is configured to deploy workloads by assigning (also known as provisioning) cloud computing environment resources, such as processors, memory, storage, etc. to the workload. In an embodiment, workloads are deployed in a production environment, which is a cloud computing environment having operable code, used for providing access to data and providing software services. In some embodiments, configuration code is implemented in a development (dev) environment, which also utilizes a cloud computing environment.

In some embodiments, a plurality of workloads are associated with a first code object (not shown) of the configuration code file 120. Workloads which are all deployed based on a same code object (i.e., the first code object) are known as a virtual instance (or "instance") of the first code object. In an embodiment, associating a workload with a code object includes assigning a name to the instance based on an identifier of the code object.

This provides an advantage where it is required to deploy multiple instances which share similar configurations, such as web servers providing access to a website. Rather than configure each instance manually and individually, an orchestrator 130 is configured to deploy a number of the same workload based on the configuration code file 120.

In some embodiments, the orchestrator 130 may configure a cloud-native orchestrator (not shown) in the cloud computing environment 140 to deploy the instances. This may be advantageous, for example, where instances need to be deployed in different cloud environments.

For example, the same instances may be deployed simultaneously on Google® Cloud Platform (GCP), Amazon® Web Services (AWS), or Microsoft® Azure. This can be achieved by configuring the orchestrator 130 to generate native instructions for a cloud native orchestrator in each environment to deploy such instances. The native instructions are generated by the orchestrator 130 in an embodiment. The instructions are generated based on objects detected in the configuration code file 120.

This method of deploying instances decreases errors by eliminating the need for a user to manually deploy each instance and configure each instance separately, and is also thus a faster method of deployment. A human is not able to consistently and reliably initiate deployment of virtual instances, and then configure hundreds or thousands of such instances to match the same specification. In the example above a first load balancer may be deployed in a first cloud computing environment, and a second load balancer may be deployed in a second cloud computing environment, each cloud computing environment having different infrastructure from each other, wherein the first load balancer and the second load balancer are deployed based on the same code object from a configuration code file.

In an embodiment, the first cloud computing environment 140 is coupled with a second cloud computing environment 150, which is configured to inspect the first cloud computing environment 140 for cybersecurity threats. In an embodiment, the second cloud computing environment 150 (also referred to as inspection environment 150) is further configured to receive the configuration code file 120.

In some embodiments, the second cloud environment 150 is utilized for inspecting the first cloud computing environment 140 and generating cybersecurity risk assessments for instances deployed in the first cloud computing environment 140.

In certain embodiments, the second cloud environment 150 includes a plurality of inspectors, such as inspector 160. An inspector is a workload which is configured to inspect another workload for cybersecurity objects, such as a secret, a file, a folder, a registry value, a weak password, a certificate, a malware object, a hash, a misconfiguration, a vulnerability, an exposure, a combination thereof, and the like. In an embodiment, an inspector 180 is configured to inspect for a plurality of cybersecurity object types.

For example, in an embodiment, an inspector is configured to inspect the virtual machine 142 for a predetermined cybersecurity object, in response to receiving an instruction to inspect the virtual machine 142. In an embodiment, the instruction is received through an API (not shown) of the first cloud computing environment 140. In some embodiments, an inspectable disk is generated based on a volume (not shown) attached to the virtual machine 142, and the inspectable disk is provided to the second cloud computing environment 150 for inspection. In an embodiment, generating an inspectable disk includes generating a clone of the volume, generating a copy of the volume, generating a snapshot of the volume, and the like. In an embodiment, a software container is deployed in the second cloud computing environment 150 and attached to a volume generated in the second cloud computing environment 150 based on the received snapshot. The inspector 160 is configured, in an embodiment, to inspect the attached volume for a predefined cybersecurity object type. In an embodiment, the inspector 160 is configured to generate data which is stored on a security graph 170. In some embodiments, a node is stored on the security graph 170 to represent an inspected resource. In an embodiment, data generated by the inspector 160 is stored on the node representing the workload which the inspector 160 inspected for a cybersecurity object.

In an embodiment, the security graph 170 is stored on a graph database. The security graph 170 includes a representation of a cloud computing environment. In an embodiment, the representation includes a plurality of nodes, at least a portion of which each represents a resource or a principal. A resource is a cloud entity which provides access to a service, computer hardware (e.g., processor, memory, storage, and the like), and the like. In an embodiment, a resource is a workload, such as a virtual machine, serverless function, software container, and the like. A principal is a cloud entity which is authorized to initiate actions in a cloud computing environment, and is authorized to act on a resource. In an embodiment, a principal is a user account, a user group, a service account, and the like.

In certain embodiments, the security graph 170 further includes enrichment nodes, which represent certain redetermined functionalities, network access, and the like. For example, an enrichment node may represent access to a public network, such as the Internet. Thus, a node representing a workload which has access to a public network, or can be accessed through a public network, is connected in the security graph 170 to an enrichment node representing public network access.

In an embodiment, a code inspector 180 is further deployed in the second cloud computing environment 150. In some embodiments, a plurality of code inspectors are deployed. In certain embodiments, configuration code is generated by multiple different type of platforms, such as Pulumi®, Terraform®, and the like.

In some embodiments, a first code inspector is configured to inspect configuration code generated using Pulumi®, while a second code inspector is configured to inspect configuration code generated using Terraform®. In an embodiment, the code inspector 180 is realized as a workload, such as an application deployed on a software container, configured to receive configuration code and inspect the configuration code to detect a predetermined type of code object. In an embodiment, a type of code object is, for example, a secret (such as a public key, or a private key), a resource type, an application identifier, a policy identifier, a role identifier, a status of a flag, and the like. A flag status indicates, in an embodiment, that a certain object is allowed to perform certain actions, such as network access, or assume a role, such as an administrator role (in the case of a user or service account).

In an embodiment, the code inspector 180 is configured to match the detected object to a node in the security graph 170. This is discussed in more detail with respect to FIG. 2 below.

Figure 2:
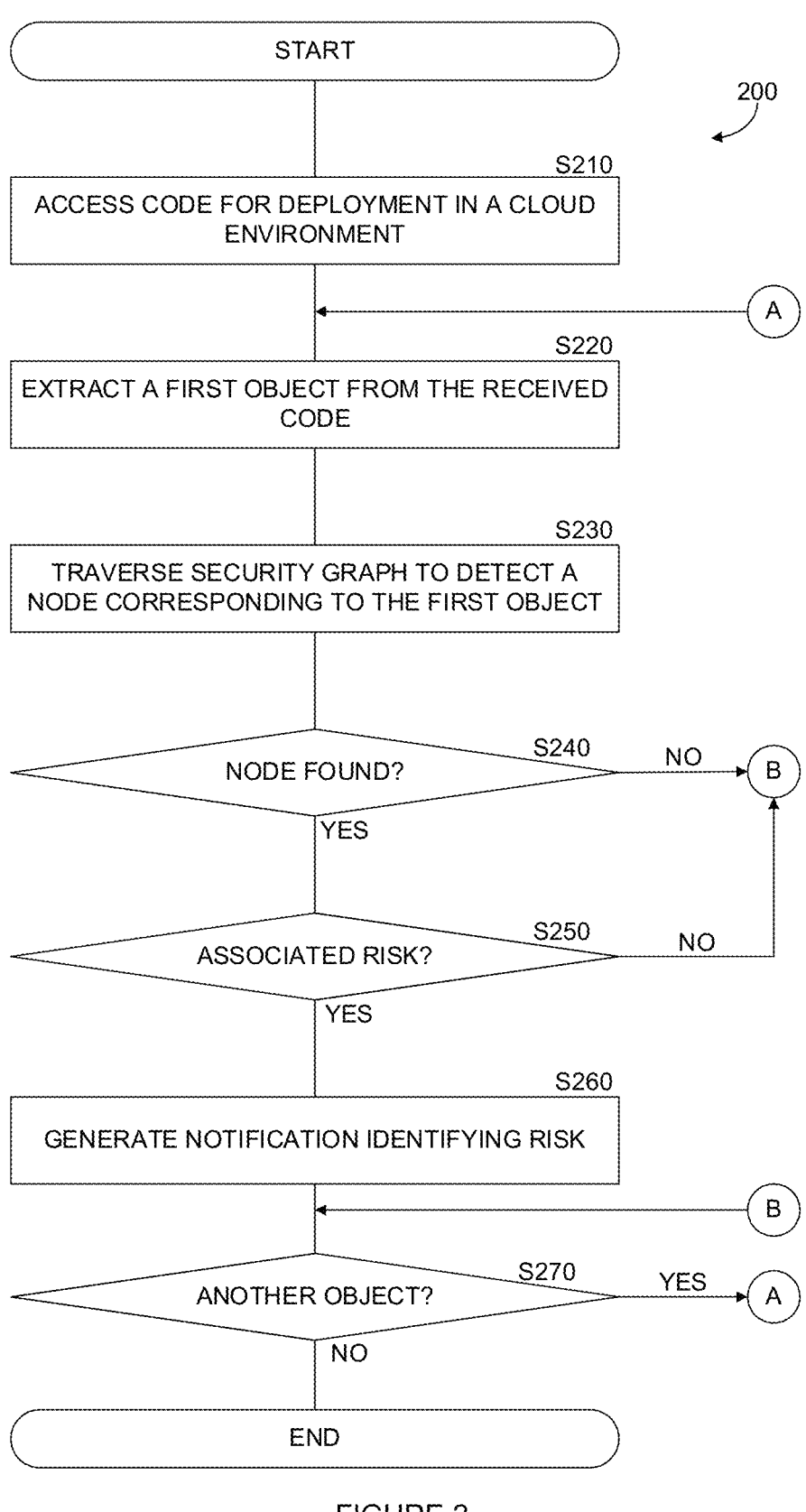
FIG. 2 is a flowchart of a method for inspecting configuration code utilizing a security graph, implemented in accordance with an embodiment.

FIG. 2 is an example flowchart 200 of a method for inspecting configuration code utilizing a security graph, implemented in accordance with an embodiment. In an embodiment, configuration code in a development (dev) environment is inspected based on a security graph which is generated at least in part based on a production environment.

A production environment is rarely, if at all, identical to the environment which is deployed initially by code. This is due to, for example, upgrades and patches implemented in the production environment to address issues caused by the code deployment. Drifting configuration, or configuration drift, describes how a production environment, over time, 'drifts' further away from the initial configuration code design. Therefore, inspecting only one environment for cybersecurity threats is not enough, and it is advantageous to inspect both.

In an embodiment, the security graph includes representations of the configuration code (e.g., representing code objects) and the production environment (e.g., representing resources and principals). By inspecting a configuration code file based on a security graph generated from data of a production environment, insight can be gained, and deployment issues may be caught early on, for example, to identify instances which if deployed based on a current version of configuration code would include a version of software which the production environment has already upgraded to a newer version. In an embodiment, the method is performed by a configuration code inspector, such as the code inspector 180.

At S210, configuration code is received. In an embodiment, the configuration code includes a plurality of code objects. In certain embodiments, a portion of the code objects correspond to instances which are deployed in a cloud computing environment. In an embodiment, the configuration code is scanned or otherwise inspected as a textual object. For example, a configuration code is searched for regular expressions (regex), strings, and the like.

At S220, a first code object is extracted from the received code. Extracting a code object includes, in an embodiment, searching the text of a configuration code file for a prede-termined string. For example, a code object may be a text field identifying a type of workload, a name of a workload, a network address, a name in a namespace, a role, a permission, and the like. In some embodiments, a plurality of code objects are extracted from the received code.

At S230, a security graph is traversed to detect a node in the graph corresponding to the extracted first code object. In an embodiment, traversing the security graph includes send-ing a request through an API of a graph database hosting the security graph to search the graph for a string, a value, and the like, which corresponds to the first code object. For example, if the first code object includes a secret, such as a private key (i.e., an alphanumerical representation), the security graph is traversed to detect a node which represents a matching public key (e.g., public key node). In an embodi-ment, the public key node is connected to a resource node representing a resource which utilizes the public key.

In some embodiments, a query directed at the security graph includes a plurality of clauses. In an embodiment, multiple-clause query is generated to search for container nodes (i.e., nodes representing containers) which are con-nected to a node representing the public key. It is noted that detecting a node which corresponds to the extracted first object includes, in an embodiment, detecting a node which is not a node representing a workload corresponding to the first object.

For example, executing code of the first code object results, in an embodiment, in deploying a first load balancer in a virtual private cloud (VPC). In an embodiment, a node is generated in a security graph to represent the first load balancer deployed in a cloud computing environment. The node representing the load balancer is connected to a node representing the VPC.

It should be appreciated that the disclosed method is that attributes of the first code object detected in the graph allows detecting nodes representing cybersecurity issues, nodes representing workloads, enrichment nodes, and the like, prior to the generation of an instance based on the code object. This allows for detecting a security risk in an instance prior to it being deployed in a computing environment. In the above example, as the code of the first code object includes instructions to deploy in the VPC, the VPC node is detected (based, for example, on detecting an identifier of the VPC in the code) in the security graph. Cybersecurity risks represented by nodes connected to the VPC node are detected, for example, by querying the security graph.

At S240, a check is performed to determine if a node is detected. If 'no' execution may continue at S270. In an embodiment, if a node is not detected (e.g., the node does not exist), a new node is generated in the security graph to represent the first code object. If a node is detected, execu-tion continues to S250.

At S250, a check is performed to determine if the detected node corresponds to a previously determined cybersecurity issue, such as a cybersecurity risk factor, vulnerability, misconfiguration, and the like. A risk factor, vulnerability, misconfiguration, and the like, may be, for example, access to a network resource (such as the Internet), access from a network resource, outdated software, privilege escalation, and the like. In an embodiment, a risk factor score is further determined. In some embodiments, the risk factor score indicates the severity of the risk, such as 'low', 'medium', 'high', and 'critical'. In an embodiment, the previously determined cybersecurity issue is detected by inspecting a disk for a cybersecurity object. In some embodiments, a detected cybersecurity issue is represented as a node in a security graph, connected to a node representing a resource on which the cybersecurity issue was detected.

In an embodiment, a mitigation instruction corresponding to the risk factor score is executed. In some embodiments, the risk factor is indicated by metadata associated with the detected node of S240. If the detected node corresponds to a previously determined cybersecurity issue, execution con-tinues at S260; otherwise, execution continues at S270.

In an embodiment, a vulnerability is represented on the security graph by a node. As an example, a node represent-ing a workload is connected to a node representing a vulnerability. Where a workload node is the detected node, a cybersecurity vulnerability is associated with the code object.

At optional S260, a notification is generated to indicate that a security risk has been detected in the configuration code. In an embodiment, the notification is sent to a client device, a user account, a combination thereof, and the like, which authored the code. Code authors are determined, in an embodiment, by a user account identifier present in the configuration code.

In some embodiments, the notification includes an indi-cator to specify why the notification is generated. In certain embodiments, an instruction to perform a mitigation action is generated. In the example above, an alert (i.e., notifica-tion) is generated in response to detecting that a workload includes an outdated software version, and the alert includes the current software version, which would need to be configured in the configuration code in order to mitigate the risk of deploying a workload with an outdated software version.

At S270, a check is performed to determine if another code object should be inspected. If yes' execution continues at S220, otherwise execution terminates.

Figure 3:
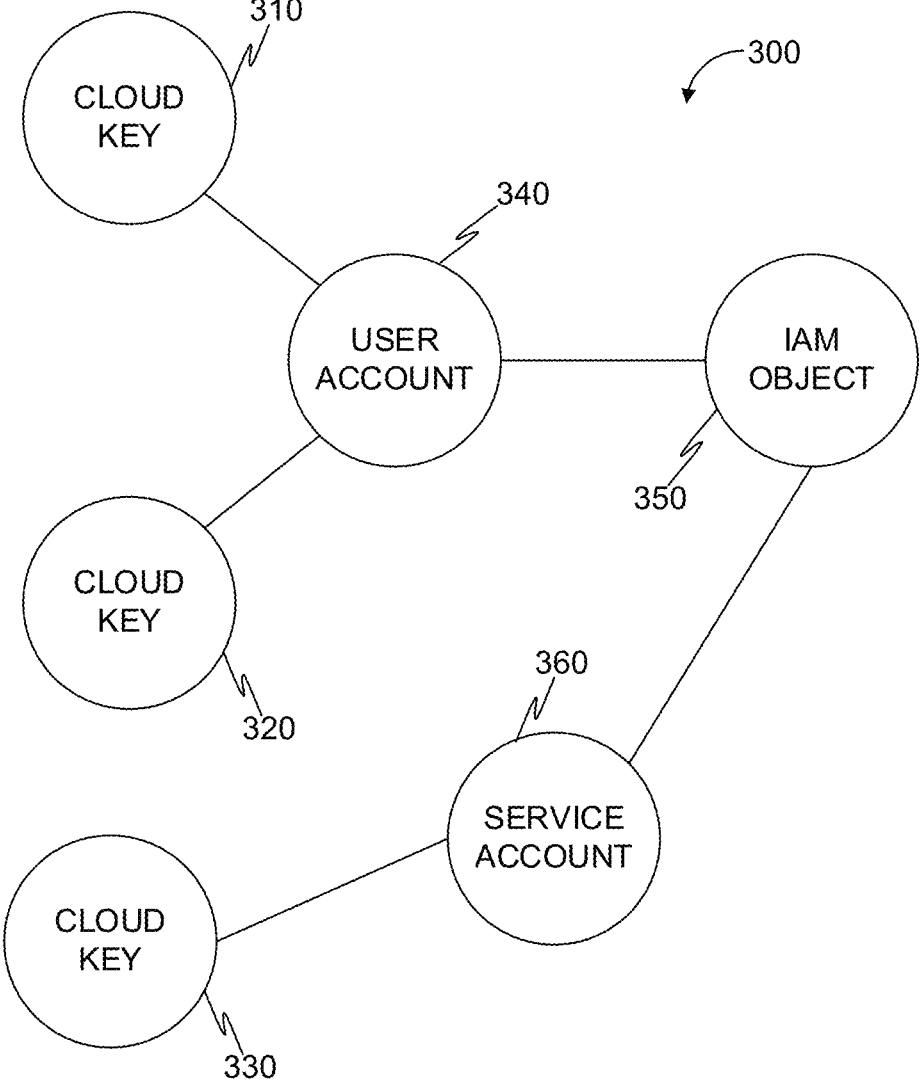
FIG. 3 is a schematic illustration of a portion of a security graph for cybersecurity risk assessment of virtual instances in a cloud computing environment, implemented in accordance with an embodiment.

FIG. 3 is a schematic illustration of a portion of a security graph 300 for cybersecurity risk assessment of virtual instances in a cloud computing environment, implemented in accordance with an embodiment. The graph 300, which in an embodiment is stored in a graph database, includes a plurality of nodes. In an embodiment, a node represents a resource, principal, metadata, enrichment data, and the like.

In an embodiment, the graph 300 includes a first cloud key node 310 (representing a first cloud key) and a second cloud key node 320 (representing a second cloud key), which are connected to a user account node 340 (represent-ing a user account). A third cloud key node 330 (representing a third cloud key) is connected to a service account node 360 (representing a service account). The user account node 340 and service account node 360 are connected to an identity and access management (IAM) object node 350 (represent-ing an IAM object).

In an embodiment, a cloud key provides temporary access, permanent access, and the like, between a first workload and a second workload. In some embodiments, one or more first workloads and one or more second work-loads may be on the same tenant, on different tenants, or on a combination thereof. In an embodiment, cloud keys are embedded into text configuration files, structured configu-ration files (e.g., JSON, YAML, XML, etc.), scripts, source code, and the like. Example implementations of cloud keys include AWS IAM access keys, OAuth® refresh tokens, access tokens, and the like.

By generating a security graph 300 including such nodes and populating it with data representing the cloud computing environment allows assessing of cybersecurity risks. For example, if a first cloud key is compromised, it is readily apparent what other objects are vulnerable as a result, by querying the security graph 300 and detecting cloud entities which are represented by nodes connected to, for example, a node representing the first cloud key. In an embodiment, each node further stores metadata and data relating to the object. For example, a cloud key node 320 may include therein a unique account identifier.

In some embodiments, the security graph 300 further includes a representation of a cybersecurity issue. For example, a misconfiguration is represented by a node in the security graph as a cybersecurity issue. In an embodiment, a node representing a cybersecurity issue is connected to a node which represents a resource. This is performed to indicate that the resource includes the cybersecurity issue. For example, an inspector is configured to detect a cybersecurity issue, and detects the cybersecurity issue on a software container which is inspected by the inspector. In an embodiment, a security graph is updated to include a node representing the software container connected to a node representing the cybersecurity issue.

In certain embodiments, generating a node representing a cybersecurity issue allows to reduce redundant information stored in a graph database, where storing a connection requires less resources than storing information about the cybersecurity issue in each node representing a resource where the cybersecurity issue is detected. This allows compact representation, thereby reducing computer resource consumption. This further allows for rapidly detecting all resources having a certain cybersecurity issue, as rather than querying each node to determine if the node includes information on a specific cybersecurity issue, a single node is queried to detect nodes connected to it. This reduces the amount of processing required on a database search.

Figure 4:
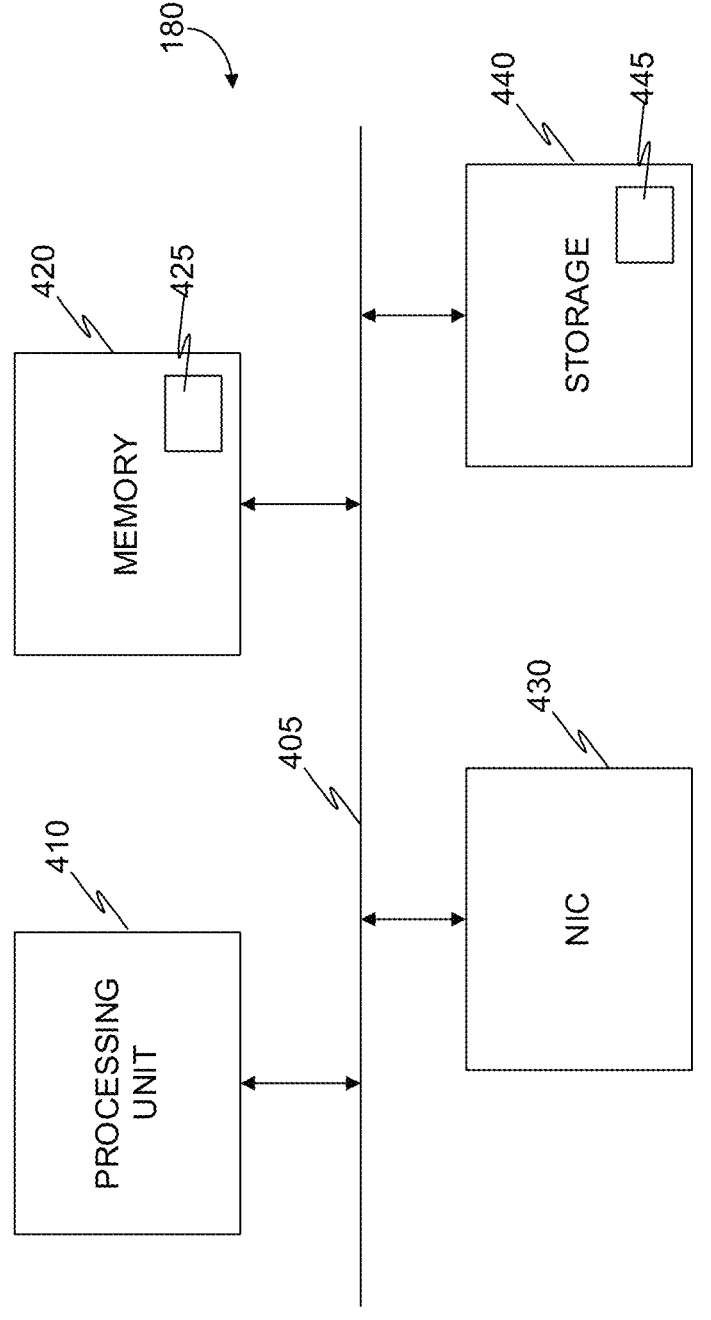
FIG. 4 is a schematic illustration of a code inspector implemented according to an embodiment.

FIG. 4 is a schematic illustration of a code inspector 180 implemented according to an embodiment. The code inspector 180 may be implemented as a physical machine or a virtual workload, such as a virtual machine or container.

When implemented as a physical machine, the code inspector 180 includes at least one processing circuitry 410, for example, a central processing unit (CPU). In an embodiment, the processing circuitry 410 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In certain embodiments it may be advantageous for the at least one processing circuitry 410 to further include one or more general purpose graphic processor units (GPGPUs). For example, for comparing and generating digests, a GPGPU may have improved performance over a CPU.

The processing circuitry 410 is coupled via a bus 405 to a memory 420. The memory 420 may include a memory portion 425 that contains instructions that when executed by the processing element 410 performs the method described in more detail herein. The memory 420 may be further used as a working scratch pad for the processing element 410, a temporary storage, and others, as the case may be. The memory 420 may be a volatile memory such as, but not limited to random access memory (RAM), or non-volatile memory (NVM), such as, but not limited to, Flash memory. The memory may further include a memory portion 425 which is used to store objects extracted from a configuration code.

The processing element 410 may be coupled to a network interface controller (NIC) 430, which provides connectivity to one or more cloud computing environments, such as the first cloud computing environment 140 of FIG. 1, via a network.

The processing element 410 may be further coupled with a storage 440. The storage 440 may be used for the purpose of holding a copy of the method executed in accordance with the disclosed technique. The storage 440 may include a storage portion 445 containing a configuration code for deployment in a cloud computing environment.

The processing element 410 and/or the memory 420 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 5:
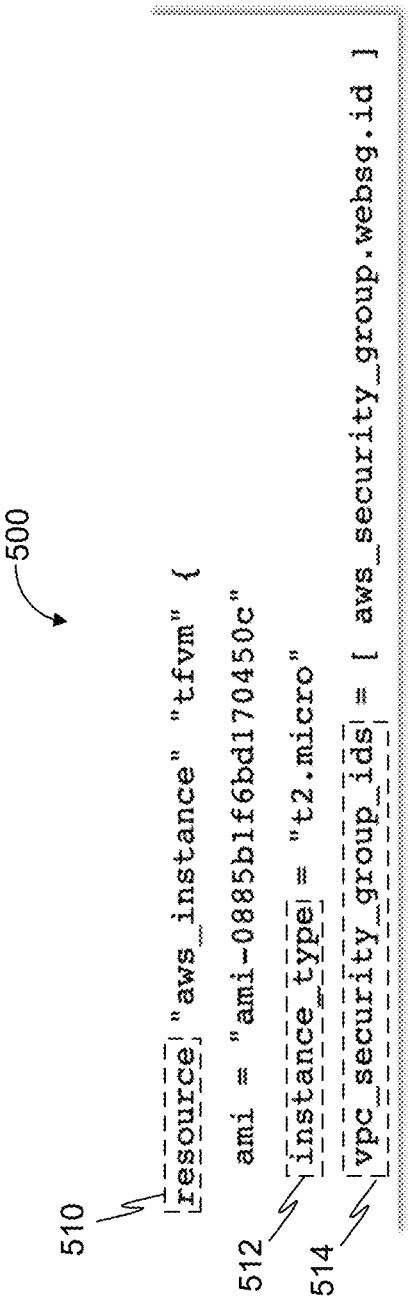
FIG. 5 is a code object, shown in accordance with an embodiment.

FIG. 5 is an example of a code object, shown in accordance with an embodiment. A code object 500 includes an object type 510. The object type 510 indicates, in this example, that this code object is a resource type, i.e., executing instructions related to this object will deploy a resource in a cloud computing environment. The object type further includes data fields, such as instance type data field 512 and network association data field 514. The instance type 512 specifies what type of resource is to be deployed, in this case the instance type is a t2.micro, which is a processing instance used in the AWS cloud computing environment. The network association field 514 indicates, in this example, that the instance should be associated with a specific virtual private cloud (VPC). In this example, the code object is a data structure having parameters (or data fields) which can be customized to generate resources, accounts, and the like, in a cloud computing environment.

Figure 6:
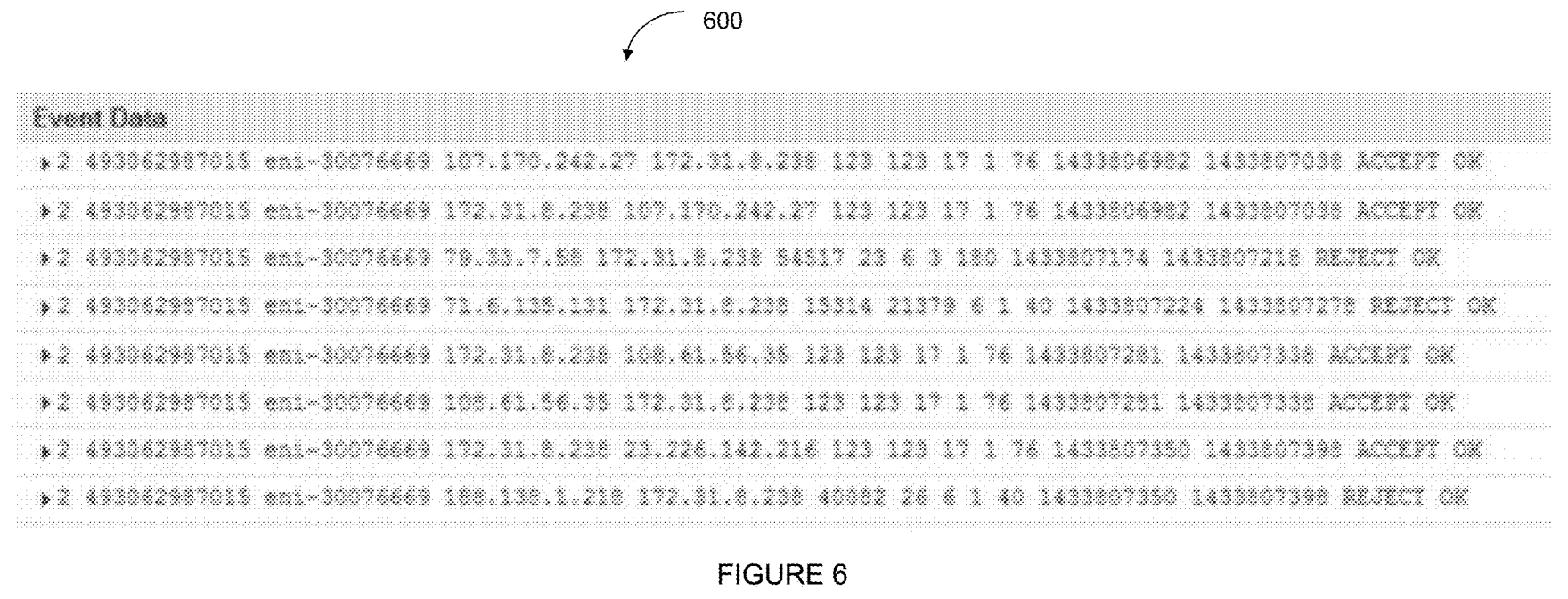

FIG. 6 is an example of a network log 600 of a cloud computing environment, in accordance with an embodiment. A network log 600 is a type of cloud log, which according to an embodiment, includes a plurality of data records, each data record corresponding to an event, each data record stored as a row in the log. An event (i.e., data record) includes, according to an embodiment, a plurality of data fields and their values. A data field is, for example, an account identifier, an interface identifier, a source address, a destination address, a port, a protocol, an amount of data transferred (e.g., a number of bytes transferred), a number of packets transferred, an action (e.g., accept, reject, etc.), a latency measurement, and the like.

Figure 7:
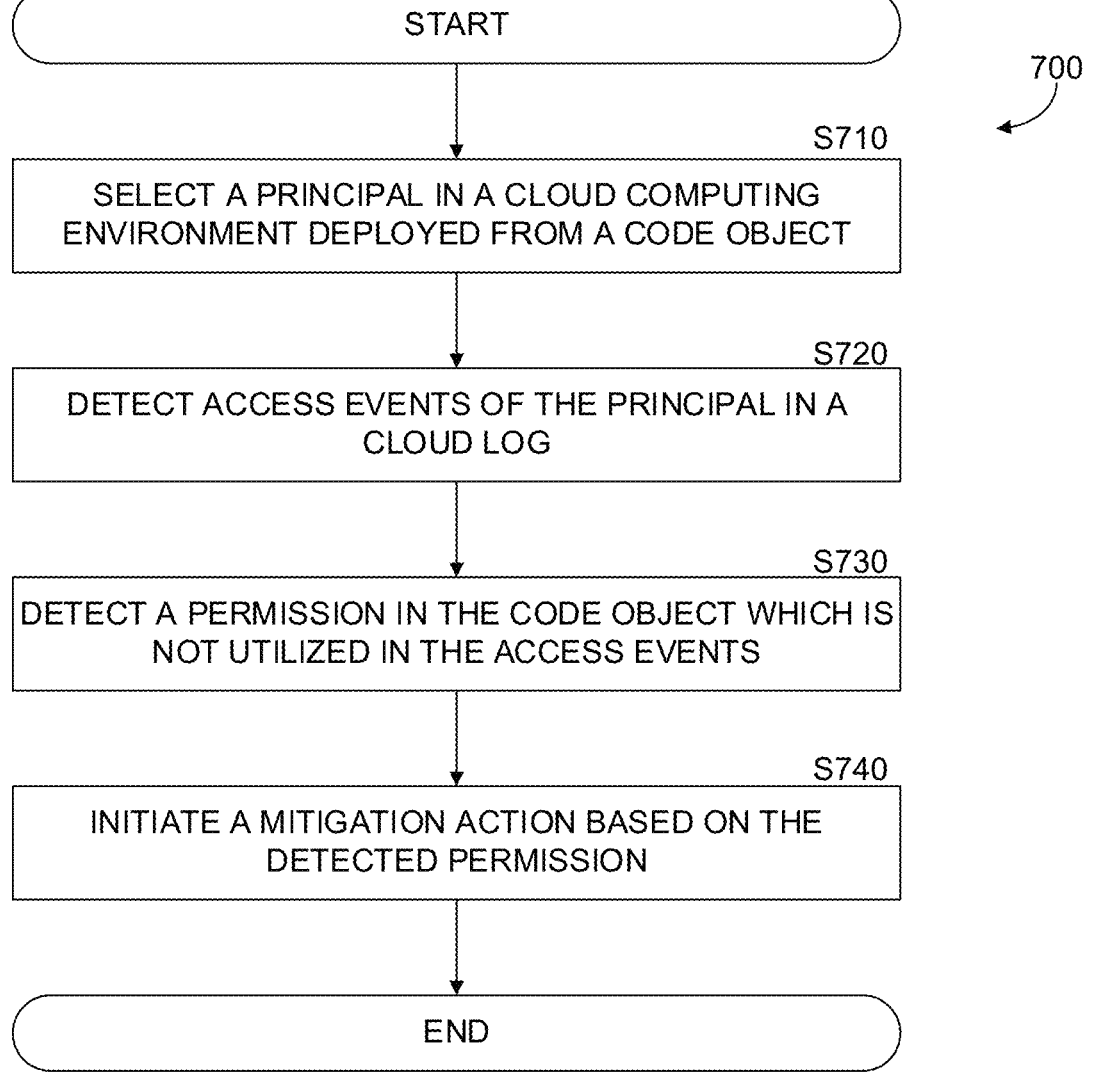
FIG. 7 is a flowchart of a method for detecting excessive permissions of a principal deployed in a cloud computing environment, implemented in accordance with an embodiment.

FIG. 7 is an example flowchart 700 of a method for detecting excessive permissions of a principal deployed in a cloud computing environment, implemented in accordance with an embodiment.

Determining what permissions are used by a principal and what permissions are not used by the principal is advantageous, as it allows determining if there is a discrepancy between what a principal can do in a cloud computing environment, and what the principal actually does. This allows, for example, to revoke permissions which are not used by a principal. In cybersecurity, it is often advantageous to reduce any principal's permission to a bare minimum which is required for the principal to function as intended in the cloud computing environment. In contrast, providing each principal root or admin-level permissions is considered extremely unsafe, as each such principal is a potential failure point for the cloud computing environment. Allowing a principal to have a permission, which is not necessary for the principal to operate means that if the principal were to become compromised, an attacker would be able to utilize the permission to their own advantage.

At S710, a first principal is selected from a plurality of principals deployed in a cloud computing environment. In an embodiment, a principal is a cloud entity that is authorized to initiate actions in the cloud computing environment, act on resources, and the like. A principal is, according to an embodiment, a user account, a service account, a role, and the like.

In some embodiments, a principal is deployed based on a code object in a configuration code. For example, a configuration code includes a code object which when executed deploys a principal having a permission, plurality of permissions, and the like, in the cloud computing environment.

At S720, a plurality of access events are detected in a log. In an embodiment, the log is a cloud log, network log, communication log, access log, a combination thereof, and the like. In an embodiment, a cloud log is an access log, and includes events for example generated by GCP IAM Recommender, AWS Access Advisor, Azure cloud events, and the like. In certain embodiments, the log includes a plurality of data records, each data record corresponding to an event, such as an access event, a communication event, a new user generation event, and the like. In some embodiments, a data record includes a plurality of data fields, data attributes, and the like, which are populated with values based on the event. For example, a data field is a timestamp, a destination identifier, an origin identifier, a network address, a name from a namespace, an IP address, an amount of data transferred, a latency measurement, a user account identifier, a service account identifier, a role identifier, a combination thereof, and the like.

In some embodiments, a log is generated in a cloud computing environment by a serverless function which is configured to monitor the cloud computing environment and write events to a log based on a predefined data record. A predefined data record includes, according to an embodiment, a plurality of data fields arranged in a predetermined order.

In an embodiment, the plurality of access events, each of which includes a data field having a common value. For example, according to an embodiment, the data field has a common value which is an identifier of a principal of the cloud computing environment. In an embodiment, the principal is a user account. Thus, according to the embodiment, the plurality of access events each correspond to an access event initiated by a user account having a unique identifier, such as email address, user name, user ID, and the like.

In some embodiments, an access event includes a data field indicating a permission utilized by the principal performing the access event. For example, where a principal initiates an access of a repository, the access event includes a role identifier of "admin", which indicates which permission the principal utilized in accessing the repository.

At S730, a permission is detected in a code object. In an embodiment, the code object is a code object in a configuration code, from which the principal, which is associated with the detected access events, is deployed in the cloud computing environment. In some embodiments, the code object includes a specific permission, a role to be assigned to a user account, to a service account, and the like. In certain embodiments, the code object includes a policy, an identifier of a policy, and the like, which is applied to a principal generated by execution of the code object. In some embodiments, detecting a permission in a code object includes determining that the permission is a role, and determining a permission associated with the role. In an embodiment, determining a permission associated with a role is performed by querying an identity and access management (IAM) service utilized by the cloud computing environment.

For example, in an embodiment, a custom role is defined on AWS® IAM, which provides credentials for a principal to access resources associated with a cloud computing environment (e.g., a VPC deployed on AWS) such as S3 buckets, DynamoDB® tables, and the like. AWS Cloud-Trail® provides a log record of principals requesting access for resources associated with the cloud computing environment (i.e., the VPC).

In certain embodiments, a permission is detected which is associated with the code object, and which is not utilized in any access event of the plurality of access events. For example, in an embodiment, the code object includes a role which is defined by an IAM server. The IAM server is queried to generate an output of a plurality of permissions associated with the role. A first permission (e.g., permission to access a first table in DynamoDB) is detected in the plurality of permissions, which is not detected in the access events. A second permission (e.g., permission to access a first S3 bucket) is detected in the plurality of permissions and in at least an access event.

In some embodiments, a threshold number of access events is determined for each permission, for a group of permissions, for a role, and the like. For example, according to an embodiment, a permission is required to be utilized in a predetermined number of access events in order to be determined as detected in an access event. For example, where a permission is used one time, which is less than the predetermined threshold of 5 (five) times, the permission is determined to be not detected in the plurality of access events. In certain embodiments, the threshold is adaptive, and is adapted based on the number of access events.

At S740, a mitigation action is initiated based on the detected permission. In an embodiment, the mitigation action includes generating an instruction which, when executed, revokes a permission from the principal. For example, the instruction is directed at an IAM server, according to an embodiment. In certain embodiments, the mitigation action includes generating a notification, an alert, a ticket in a ticketing system, and the like, in response to determining that the detected permission is not utilized in the plurality of access events.

In some embodiments, the mitigation action includes generating an updated code object based on the code object and a permission detected in any of the plurality of access events. In certain embodiment, the configuration code is updated with the updated code object, for example by removing, deleting, and the like, the code object, and inserting into the configuration code the updated code object.

In certain embodiments, the updated code object includes a new role, the new role generated based on a plurality of permissions detected in the plurality of access events. For example, according to an embodiment, an IAM server is configured to generate a new role, the new role associated with each permission detected in the plurality of access events. In an embodiment, the update code object is generated based on the code object, with the new role in place of a permission, a plurality of permissions, a role, and the like, which are present in the code object.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting excessive permissions of a principal in a cloud computing environment, comprising:
accessing a configuration code, the configuration code including a plurality of code objects, wherein a code object of the plurality of code objects corresponds to a deployed principal in the cloud computing environment;
detecting in a log a plurality of access events, each access event associated with a first principal deployed in the cloud computing environment based on a first code object of the plurality of code objects;
determining that the first code object includes a permission which is not utilized in any of the plurality of access events; and
initiating a mitigation action for the first principal based on the permission.

2. The method of claim 1, further comprising:
revoking the permission from the first principal.

3. The method of claim 1, further comprising:
generating any one of: a notification, an alert, and a combination thereof, in response to determining that the first code object includes a permission which is not utilized in any of the plurality of access events.

4. The method of claim 1, further comprising:
generating an updated first code object, based on the first code object, and a permission utilized in any of the plurality of access events.

5. The method of claim 4, further comprising:
generating an updated configuration code based on replacing the first code object with the updated first code object.

6. The method of claim 4, further comprising:
generating a new role including each permission detected in the plurality of access events; and
generating the updated first code object based on the first code object and the new role.

7. The method of claim 1, wherein the log is any one of: a cloud log, a network log, an event log, and any combination thereof.

8. The method of claim 1, wherein each access event corresponds to an access of a resource in the cloud computing environment.

9. The method of claim 8, wherein the resource is any one of: a repository, a database, a bucket, a hosted application, a virtual machine, a software container, a serverless function, an appliance, and any combination thereof.

10. The method of claim 1, wherein the log includes a plurality of data records, each data record including a plurality of values which are written to the log based on an event in the cloud computing environment.

11. The method of claim 1, wherein each of the plurality of access events corresponds to a permission associated with the first code object.

12. A non-transitory computer readable medium having stored thereon instructions for causing a processing circuitry to execute a process, the process comprising:
accessing a configuration code, the configuration code including a plurality of code objects, wherein a code object of the plurality of code objects corresponds to a deployed principal in the cloud computing environment;
detecting in a log a plurality of access events, each access event associated with a first principal deployed in the cloud computing environment based on a first code object of the plurality of code objects;
determining that the first code object includes a permission which is not utilized in any of the plurality of access events; and
initiating a mitigation action for the first principal based on the permission.

13. A system for detecting excessive permissions of a principal in a cloud computing environment, comprising:

a processing circuitry; and a memory, the memory containing instructions that, when executed by the processing circuitry, configure the system to:

access a configuration code, the configuration code including a plurality of code objects, wherein a code object of the plurality of code objects corresponds to a deployed principal in the cloud computing environment;

detect in a log a plurality of access events, each access event associated with a first principal deployed in the cloud computing environment based on a first code object of the plurality of code objects;

determine that the first code object includes a permission which is not utilized in any of the plurality of access events; and initiate a mitigation action for the first principal based on the permission.

14. The system of claim 13, wherein the memory contains further instructions which, when executed by the processing circuitry, further configure the system to:

revoke the permission from the first principal.

15. The system of claim 13, wherein the memory contains further instructions which, when executed by the processing circuitry, further configure the system to:

generate any one of: a notification, an alert, and a combination thereof, in response to determining that the first code object includes a permission which is not utilized in any of the plurality of access events.

16. The system of claim 13, wherein the memory contains further instructions which, when executed by the processing circuitry, further configure the system to:

generate an updated first code object, based on the first code object, and a permission utilized in any of the plurality of access events.

17. The system of claim 16, wherein the memory contains further instructions which, when executed by the processing circuitry, further configure the system to:

generate an updated configuration code based on replacing the first code object with the updated first code object.

18. The system of claim 16, wherein the memory contains further instructions which, when executed by the processing circuitry, further configure the system to:

generate a new role including each permission detected in the plurality of access events; and generate the updated first code object based on the first code object and the new role.

19. The system of claim 13, wherein the log is any one of: a cloud log, a network log, an event log, and any combination thereof.

20. The system of claim 13, wherein each access event corresponds to an access of a resource in the cloud computing environment.

21. The system of claim 20, wherein the resource is any one of: a repository, a database, a bucket, a hosted application, a virtual machine, a software container, a serverless function, an appliance, and any combination thereof.

22. The system of claim 13, wherein the log includes a plurality of data records, each data record including a plurality of values which are written to the log based on an event in the cloud computing environment.

23. The system of claim 13, wherein each of the plurality of access events corresponds to a permission associated with the first code object.

* * * * *